(12) United States Patent
Plummer (10) Patent No.: US 9,326,485 B2
(45) Date of Patent: May 3, 2016

(54) METHOD AND SYSTEM FOR CLEANING ANIMAL PAWS

(71) Applicant: Robert Leonardo Plummer, Scarsdale, NY (US)

(72) Inventor: Robert Leonardo Plummer, Scarsdale, NY (US)

(*) Notice: Subject to any disclaimer, the term of this patent is extended or adjusted under 35 U.S.C. 154(b) by 0 days.

(21) Appl. No.: 14/268,255

(22) Filed: May 2, 2014

(65) Prior Publication Data

US 2014/0326193 A1 Nov. 6, 2014

Related U.S. Application Data

(60) Provisional application No. 61/819,547, filed on May 4, 2013.

(51) Int. Cl.
*A01K 13/00* (2006.01)
*A01J 7/04* (2006.01)

(52) U.S. Cl.
CPC . *A01K 13/001* (2013.01); *A01J 7/04* (2013.01)

(58) Field of Classification Search
CPC ............... A01K 13/001; A01K 13/004; A46B 2200/3073; A46B 9/02; A46B 11/00; B08B 1/00
USPC ......... 119/652, 656, 664, 666, 673, 601, 602, 119/612, 621
See application file for complete search history.

(56) References Cited

U.S. PATENT DOCUMENTS

| | | | | | |
|---|---|---|---|---|---|
| 2,976,841 | A | * | 3/1961 | Scheffer | 119/622 |
| 4,813,091 | A | * | 3/1989 | Glasener | 15/160 |
| 5,321,867 | A | * | 6/1994 | Probst | 15/160 |
| 5,460,121 | A | * | 10/1995 | Udelle et al. | 119/600 |
| 5,579,720 | A | * | 12/1996 | Udelle et al. | 119/621 |
| 5,782,206 | A | * | 7/1998 | Markowitz | 119/622 |
| 5,794,301 | A | * | 8/1998 | Hietala | 15/104.92 |
| 6,065,431 | A | * | 5/2000 | Davis | 119/600 |
| 6,269,512 | B1 | * | 8/2001 | Thomson et al. | 15/104.92 |
| 6,708,363 | B2 | * | 3/2004 | Larsen | 15/104.92 |
| 7,258,078 | B1 | | 8/2007 | Maiello | |
| 7,302,915 | B2 | * | 12/2007 | Leary et al. | 119/664 |
| 7,444,959 | B2 | * | 11/2008 | Hensley | 119/622 |
| 7,654,228 | B1 | | 2/2010 | Graham et al. | |
| 8,001,645 | B2 | | 8/2011 | Kaufman et al. | |
| 8,371,247 | B2 | * | 2/2013 | Fleming | 119/652 |
| 2002/0069472 | A1 | * | 6/2002 | Glass | 15/104.92 |
| 2002/0152568 | A1 | * | 10/2002 | Dillinger | 15/104.92 |
| 2005/0011467 | A1 | * | 1/2005 | Mulich et al. | 119/651 |
| 2014/0165310 | A1 | * | 6/2014 | Byrne | 15/21.1 |

* cited by examiner

*Primary Examiner* — Yvonne Abbott-Lewis
(74) *Attorney, Agent, or Firm* — Andrew F. Young, Esq.; Lackenbach Siegel, LLP (57) ABSTRACT

The invention provides a method and system for cleaning pet paws providing a bounded container containing a plurality of soft scrub brushes defining a paw cleaning region within an outer container wall wherein cleaning solution can flow freely within the container between a paw-for-cleaning, the container wall, and the brushes while allowing space for sediment. A spill resistant lid allows easy transport. An optional splash resistant lid containing a further brush boundary enables an enhanced side leg cleaning. The proposed method and system enables an enhanced deep cleaning through repeated submersion within the container and removable of debris. The system aids in prevention of infection and disease.

8 Claims, 7 Drawing Sheets

METHOD AND SYSTEM FOR CLEANING ANIMAL PAWS

CROSS REFERENCE TO RELATED APPLICATIONS

This application relates to and claims priority from U.S. Ser. No. 61/819,547 filed May 4, 2013, the entire contents of which are incorporated herein by reference.

FIGURE FOR PUBLICATION

FIG. 1

BACKGROUND OF THE INVENTION

1. Field of the Invention

The present invention relates to a method and system for cleaning pet paws or other animal appendages including feet, hooves, ears, tails, and limbs. More particularly, the present invention provides a method and system for cleaning pet appendages that is readily transported and stored between uses, readily adapts to specific uses, and enables rapid and effective appendage cleaning but may be readily cleaned and sealed between uses.

2. Description of the Related Art

Conventional pet foot cleaning devices are generally known from simple washings in a tub or basin using soapy water and optionally with the use of hand-agitation. Over time more complex, and expensive, devices have been developed.

One such complex device is a grooming and cleaning scissor action device using a pair of opposed semi-circular brushes, as seen in U.S. Pat. No. 7,258,078 (Maiello), the contents of which are incorporated herein by reference. In use, the brushes are placed about a base of an animal tail, limb, or paw, and squeezed together applying pressure to the animal appendage. It is envisioned, that in cleaning such an animal would be outside, or standing in a tub able to receive any removed debris. Unfortunately, there is no ability to transport the cleaning device convenient with cleaning solution, and the device is not convenient to all forms of appendage. In use, the device is more for show-grooming to fluff-hair than for real cleaning. The device cannot be easily transported post-use or sterilized.

Another difficult device is a paw sucker as shown in U.S. Pat. No. 7,654,228 (Graham), the entire contents of which are incorporated herein by reference, where an extensive spray and suction device (operating with a suction motor) is placed about a paw and agitated. A complex discharge hose and separate waste canister are employed requiring extensive costs and difficulty.

A different product tube is provided with a splash guard in U.S. Pat. No. 8,371,247 (Flemming), the entire contents of which are incorporated herein by reference, wherein a sort of elastic sock is placed about a curved frustoconical tube. During use, an animals foot is thrust within, but lacking any retaining or sealing feature, the sock is readily released from the tube and be retained on a paw or foot, easily spilling any solution in the frustoconical tube, and being otherwise non-usable for transport and easy steralization.

In an unrelated human pre-operative surgical cleaning device U.S. Pat. No. 4,181,446 (Kaufman), the entire contents of which are incorporated herein by reference, a flexible surgical scrubber brush is provided that has bristles on one side and a rubbing pad or sponge on a back side thereof. In cleaning a human patient or medical device, extensive user-hand manipulation bends and flexes the brush and forces the bristles of the brush into finger joints.

ASPECTS AND SUMMARY OF THE INVENTION

In response, it is now recognized that there is a need for an improved paw cleaning method and system that addresses at least one of the concerns noted.

In another aspect of the present invention, there is a method and system provided to reduce or eliminate the transmission of bacteria, parasites, fungus, toxins, contaminants, irritants, chemicals, and waste products found on roads, sidewalks, parks into user's homes, automobiles, or other locations where cleanliness is desired.

In one aspect of the present invention, there is provided a method and system for cleaning pet limbs, particularly feet, providing a bounded container containing a plurality of soft scrub brushes defining a paw cleaning region within an outer container wall wherein cleaning solution can flow freely within the container between a paw-for-cleaning, the container wall, and the brushes while allowing space for sediment.

Another alternative aspect of the present invention provides a sealing spill resistant lid for sealing the container between uses for easy transport and containing any fresh cleaning solution, or transporting any post-cleaning debris prior to disposal.

In another alternative aspect of the present invention a splash resistant lid contains a further brush boundary feature enabling an enhanced side limb or leg cleaning during use.

In another alternative aspect of the present invention, the proposed method and system enables an enhanced deep cleaning through repeated submersion within the container and removable of debris. The system aids in prevention of infection and disease.

It is another alternative aspect of the present invention, wherein, the brush elements may be provided in a fixed form or in an optional removable-replaceable form. For example, a separate removable brush-holding cradle, or even a removable brush, may be used or slots or retainer structures may be formed directly into the container wall to removable-receive brushes or a brush-holding cradle. The brushes, in such brush-holding cradle or the slots or retaining structures, may be recycled (but cleaned or not yet used) brushes. Such brushes may be sourced, for example, from the surgical procedure brushes (approximately 1-5 million used annually) many of which are 'used' in a medial sense (not sterile) and must be discarded for safety, but which are fully-clean and ready for use in a practical animal-cleaning process. For example, a brush package (noted below) may be opened-for-surgical-use, but never actually used—such a brush is fully clean but cannot be re-packaged and must be thrown away, and could be recycled for use in the present invention. In another example, such brushes may have an 'expiration' or 'use by' date on such packaging when made in mass, and non-use prior to the date prevents use on a human patient. The present invention promotes recycling by providing a system to use such devices.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

Figure 1A:
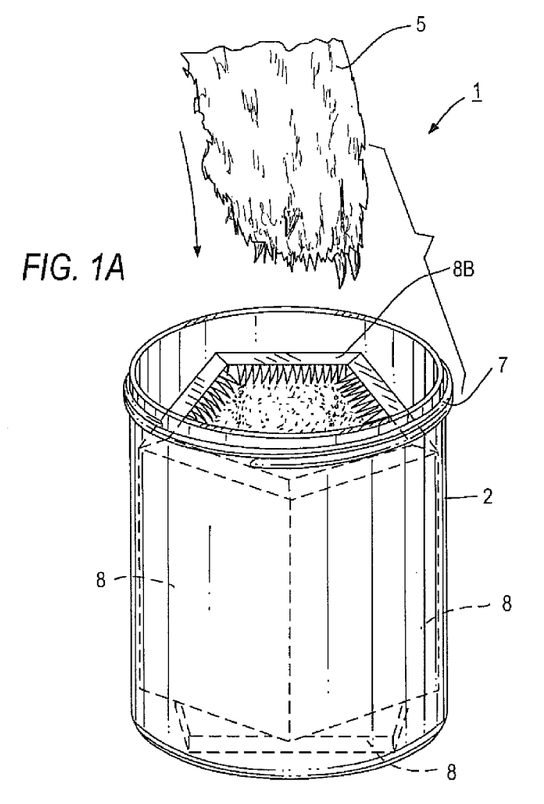
FIG. 1A is an illustrative view of the proposed system relative to a paw to be cleaned.
Figure 1B:
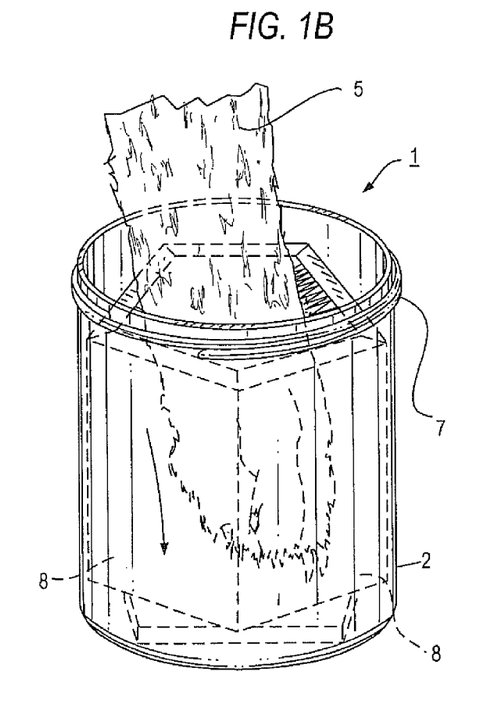
FIG. 1B is an illustrative view of the proposed system with a paw inserted for cleaning.

Referring now to FIGS. 1A and 1B, a proposed cleaning system 1 is provided with a container 2 for retaining, and optionally removably retaining one or more brushes 8 relative to an animal limb 5 (a paw is shown) to be cleaned. Container 2 includes threads 7 about an outer upper surface thereof for removable engagement with a cleaning cover 3, or a sealing lid or cover 4, as will be discussed. During a use, limb 5 is thrust within container 2 and agitated with bristles 8B of brushes 8 for removal of debris and detritus. Additional solutions may be added, including water, detergent, and other types, without departing from the scope and sprit of the present invention.

Figure 2:
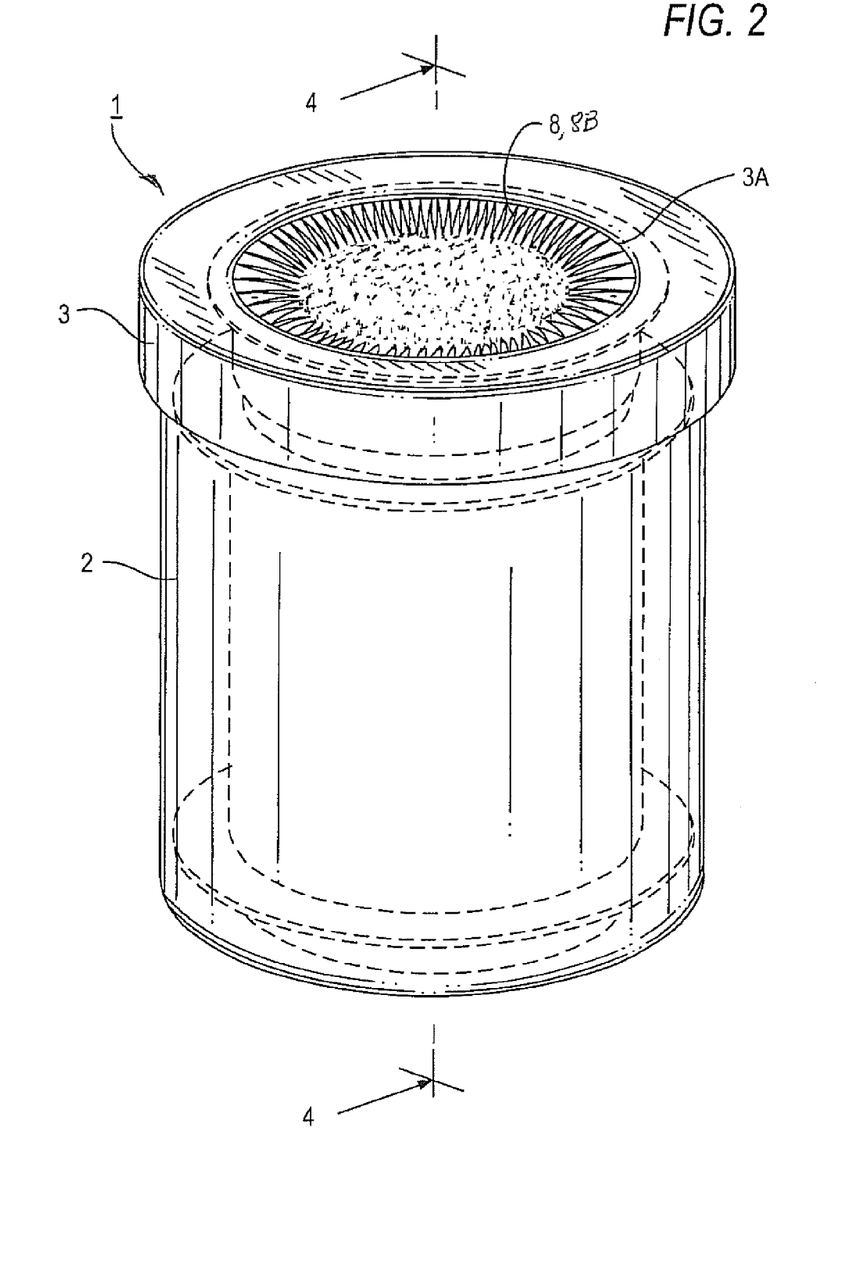
FIG. 2 is a perspective view of the proposed system with a cleaning cover installed for use.
Figure 3:
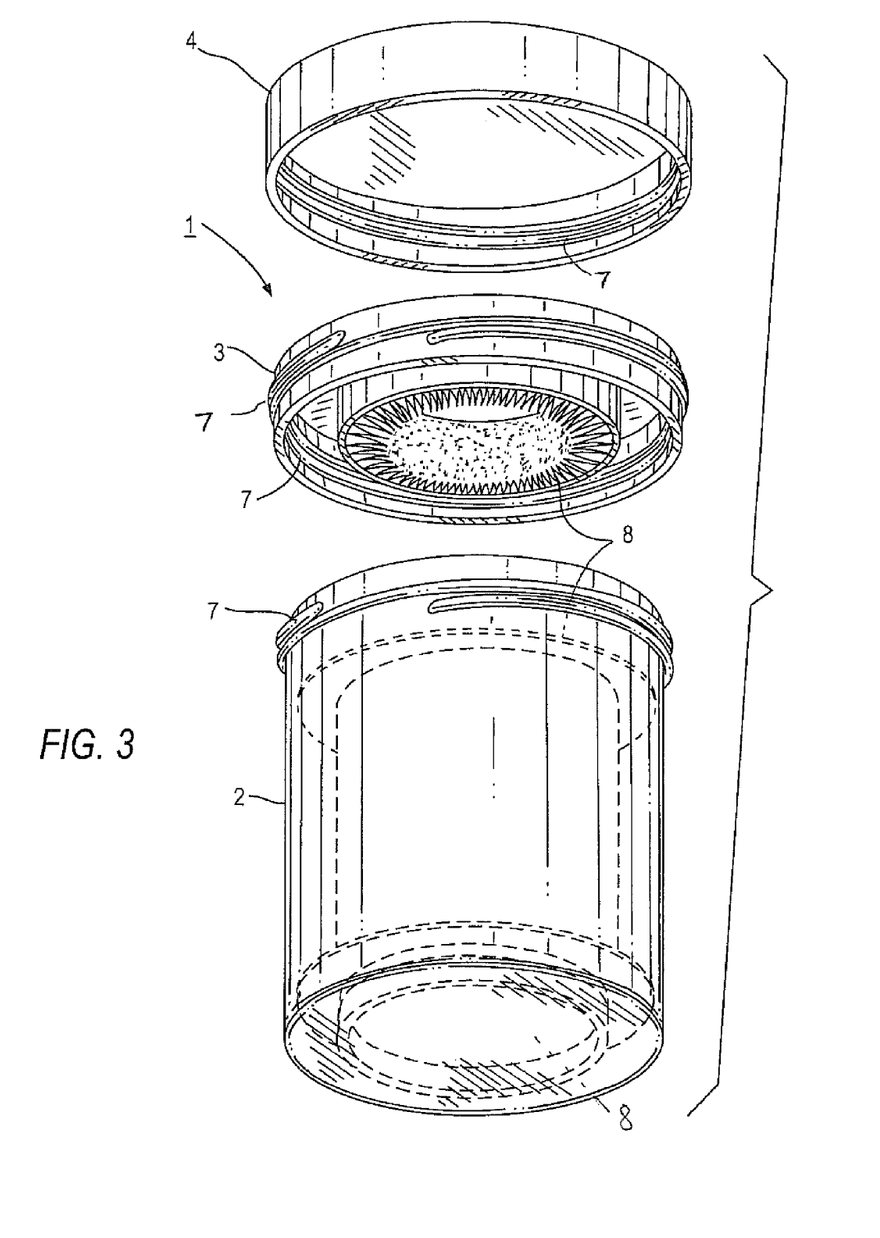
FIG. 3 is an exploded view of FIG. 2 with an alternative sealing lid optionally provided for the container.

Additionally referring now to FIGS. 2 and 3, wherein system 1 is provided with a threadably secured cleaning cover 3 having a cleaning opening 3A for receiving limb 5 therein. As shown in FIGS. 2 and 3, the inner surface of cleaning opening 3A additionally contains a brush element 8 with bristles 8B facing inwardly. Additionally, in FIG. 3, sealing lid 4 is provided having an interior threading section 7 (as shown) which may threadably engage an additional outer threaded section on the outer surface of cleaning lid 3, see FIG. 3 for this version. As will be appreciated in FIG. 3, an entire system 1 may be modified to have, in combination container 2, cleaning lid 3, and sealing lid 4, or (as shown in FIG. 2) system 1 may including container 2 and cleaning lid 3, without a cover.

In either case, cleaning cover 3 may be readily modified to have threads 7, on an inner or outer surface, or both, without departing from the scope and spirit of the present invention. Additionally, it will be noted that threads 7 may be replaced with sealing tabs (not shown) sealing frictio-rings (like a sealing lid), or any other type of engagement system to secure cover 3 or lid 4 to container 2, without departing from the scope and spirit of the present invention.

Figure 4:
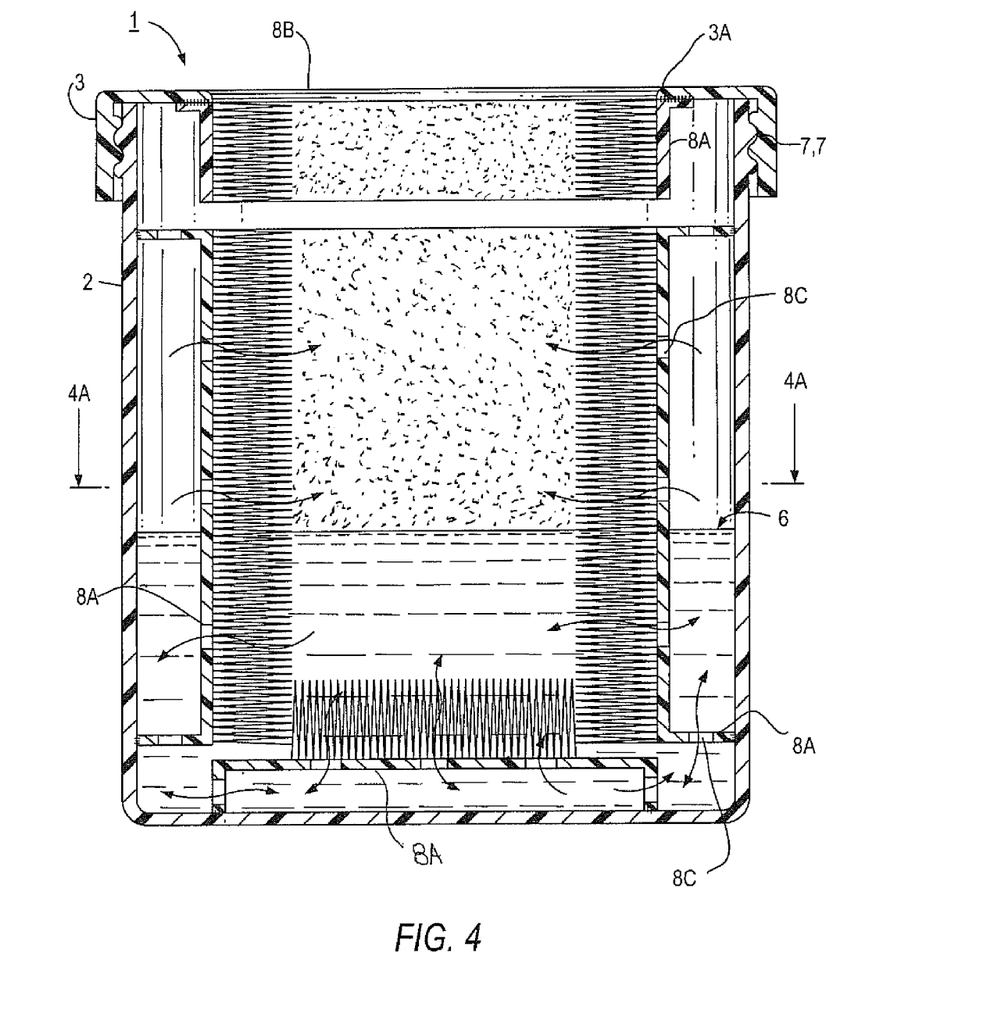
FIG. 4 is a sectional view along Section 4-4 in FIG. 2.
Figure 4A:
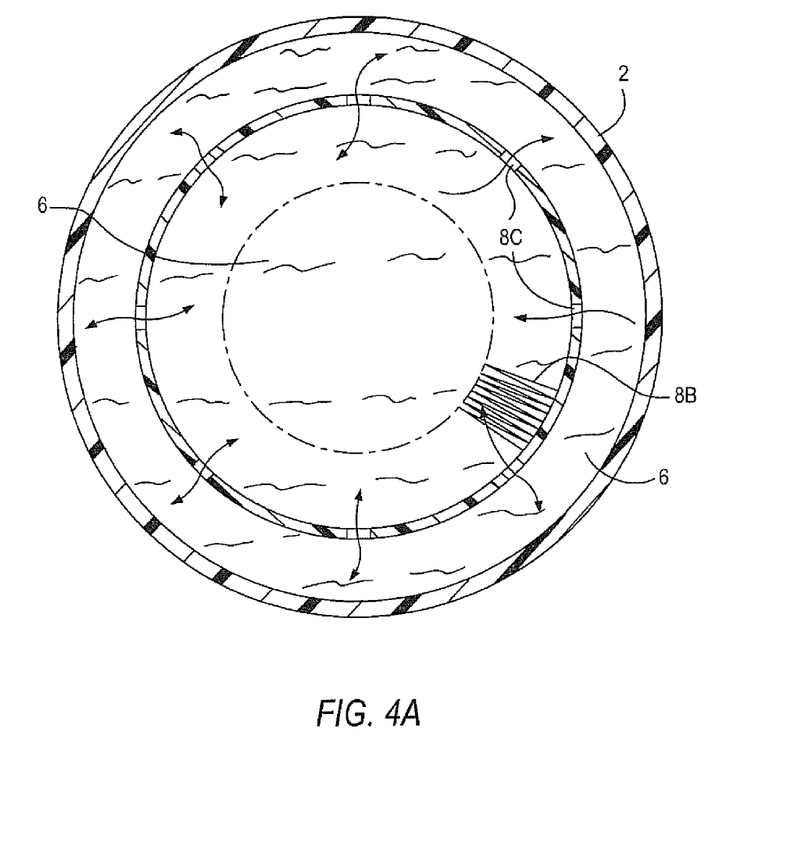
FIG. 4A is a sectional view along section 4A-4A in FIG. 4.

Additionally referring now to FIGS. 4 and 4A, wherein a cross section and top-section view are provided of a system 1, engaged and containing solution 6, which may be any suitable fluid component, or combination of components for washing, sterilizing, etc. and may contain antimicrobial, antibiotic, anti-fungal, or other curative and assistive components, and solutions within the scope of the present invention. For example, medical treatment components may be added to solution 6.

As will be appreciated each brush 8 contains a brush base 8A that spaces the respective brush 8, having bristles 8B from the outer container 2. Base 8A contains flow openings 8C both on a side leg region and a base region supporting bristles 8B. It will therefore be recognized by those of skill in the art having studied the present invention, that solution 6 may flow readily between bristles 8B, base 8A, flow holes 8C and brush 8 during a use, and may slosh throughout system 1 to aid in treating, cleaning, rinsing, or contacting an animal limb 5 during a use. See for example the flow arrows noted in FIGS. 4 and 4A. It will also be understood, that solution 6 may be of any level in system 1. It will also be understood that any debris or detritus removed from an animal limb 5 during use, may remain within container 2 post-use, so as to allow for easy removal and rinsing-out by removal of cleaning cover 3.

It will additionally be understood, that the proposed system 1 may function suitably without a cleaning cover 3 (as is shown in FIGS. 1A, 1B. For example, where an especially large animal limb 5 is used, cover 3 may be unduly restricting, and may be removed.

Figure 5:
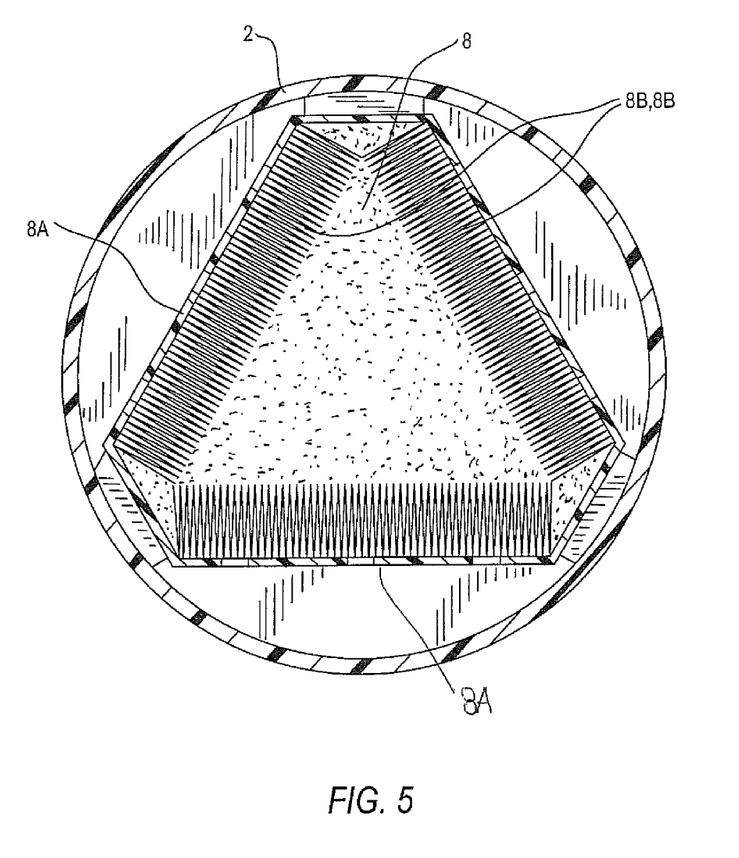
FIG. 5 is a top plan view of an alternative sectional through a container as in FIG. 1A, shown with three brush elements.
Figure 6:
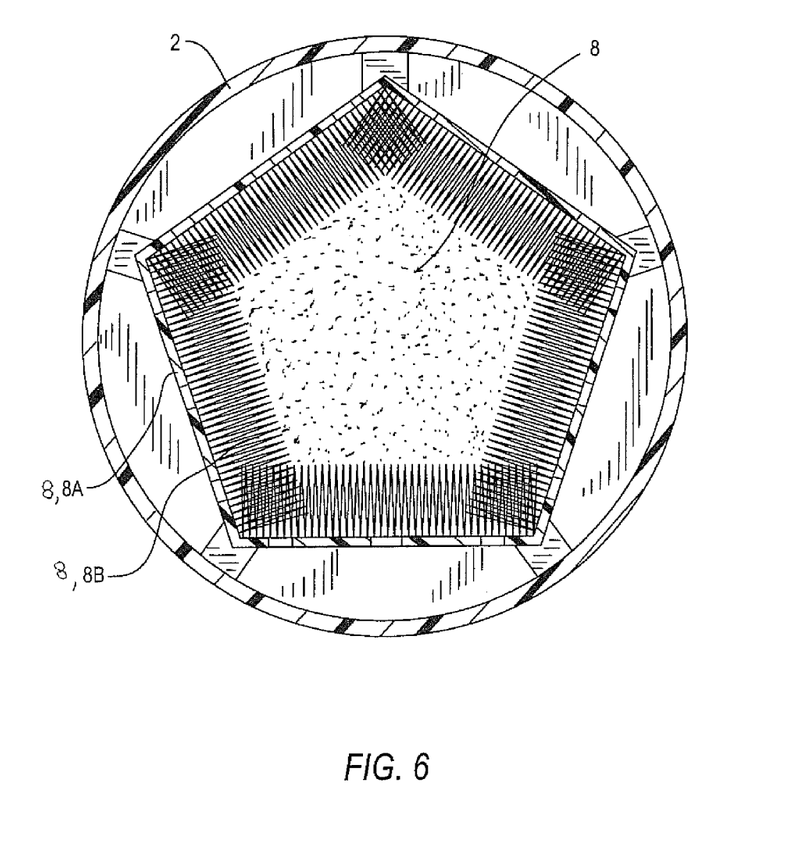
FIG. 6 is a top plan view of another alternative section through a container as shown in FIG. 1A, shown with five brush elements.

Referring now to FIGS. 5 and 6, it will be noted that instead of a roundish, brush 8 (central brush 8 shown in FIGS. 2-4A, several component member brushes 8 may be used for similar effects without departing from the scope and spirit of the present invention. For example, as seen in FIG. 5, four brushes 8 may be arranged (one on the bottom and three in triangle form). For another example, as seen in FIG. 6, six brushes 8 may be arranged (one on the bottom and five in pentagon form). In the examples in FIGS. 5 and 6, it will be understood, that a plurality of brushes 8, or a continuous brush 8, may be used without departing from the scope and spirit of the present invention.

In an alternative embodiment regarding FIGS. 2 and 3, it will be understood that side and bottom brushes 8 maybe formed as a single integral unit, that is slidably removable from within container 2 without departing from the scope and spirit of the present invention. For example, a unitary replacement brush unit (not shown) may be slidable removable in and out of container 2 within the scope of the present invention. Additionally, a further example would involve a brush-carrier unit (not shown), wherein a plurality individual brushes 8 (linear, arc shaped or otherwise) may be removably retained in a brush-carrier unit (not shown) that is slid within container 2 for holding replacement brushes.

In one aspect of the present invention, surgical scrub brushes are employed in the container and cleaning lid derived from Scrub Care® which is a surgical scrub brush-sponge/nail cleaning mixed with Exidine®4 a type of germicidal solution; Allegiance Heathcare Corporation, McGaw Park, Ill. 60085 US, (NDC 63517-007-25). In this use, the surgical brushes are constructed from a suitable plastic (polyethylene (PE), high density PE (HDPE), medium density PE (MDPE), low density PE (LDPE), or any other type of plastic suitable for the purposes intended. Additionally, the brushes are not limited to plastic, but may be constructed from suitable natural materials, including but not limited to, fibers, hair, bristles, and any other type of natural brush-like fiber that would be suitable for the purposes intended. Additionally, a brush may be constructed from a combination of materials without departing from the scope and spirit of the present invention. For example, a brush backing may be of plastic and bristles may be boar-hair or other natural material, and vice-versa.

It is another alternative aspect of the present invention, that a the brush construction/bristle construction shown within the container may be formed in alternative shapes without departing from the scope and spirit of the present invention. For example, a continuous bounding surface of bristles may be provided (e.g., a circular bristle surface), or any other related shape. Additionally, a brush may be removed from a floor/bottom surface of the container as a modification thereof. Additionally, a brush-holding cradle may be inserted into the container, so that the brush-holding cradle may be removed from the container (the brushes not being fixed to the container wall, but fixed to a brush-holding cradle (noted but not shown). As a result, it will be apparent to those of skill in the art having studied the present disclosure that the method and system may be modified without departing from the scope and spirit of the present invention.

It will also be understood, that as used herein the device may be used with any cleaning solution, soap, detergent, germicidal or antiseptic for dispersion or surface scrubbing known within the surgical or veterinarian arts without departing from the scope and spirit of the present invention.

It will be understood that the present invention relates to a method and system for cleaning pet paws or other animal appendages including feet, hooves, and limbs. It will be understood that a dog-paw may be conveniently used, but also conveniently a sheep hoof may be cleaned, or a rabbit foot—all with differing shapes and needs for cleaning, but all ready cleaned by adaptive us of the present device. Therefore, it will be recognized by one of skill in the art having studied the present disclosure, that the present device using a plurality of flow-through type brushes may be easily used to clean a range of animals. For example, cleaning sheep hooves for serious medical treatment or disease prevention or cleaning a pet-dog foot following a simple walk during a winter or muddy day. More particularly, the present invention provides a method and system for cleaning pet appendages that is readily transported and stored between uses, readily adapts to specific uses, and environments proximate that treatment surface is not limited.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A system, for cleaning an animal limb during a use, comprising:
    a container bounding an internal receiving region and an access opening;
    at least one side brush element within said receiving region bounding a scrubbing region;
    said scrubbing region being within said receiving region;
    at least one bottom brush element in said receiving region;
    said at least one bottom brush element having bristles directed toward said access opening;
    a fluid cleaning solution within said scrubbing region, whereby said fluid cleaning solution facilitates a cleaning of said limb during said use;
    a plurality of side brush elements within said receiving region;
    a cleaning cover removably securable to said container proximate said access opening;
    said cleaning cover containing at least one cover brush bounding a cleaning opening in said cleaning cover proximate said access opening upon an assembly with said container;
    said at least one cover brush including cover bristle members; and
    said cover bristle members directed inwardly, thereby providing a scrubbing contact during a washing use with said limb.

2. The system, according to claim 1, wherein:
    said at least one side brush member is one of a continuously bounding side brush member continuously bounding said scrubbing region in a unitary manner and an assembly of individual side brushes each respectively operative to bound said scrubbing region.

3. The system, according to claim 2, further comprising:
    a sealing lid removably securable to at least one of said container and said cleaning cover, whereby said sealing lid enables an operative leak-sealing of said container between said respective uses.

4. The system, according to claim 2, wherein:
    said at least one side brush is said continuously bounding side brush member.

5. The system, according to claim 2, wherein:
    said at least one side brush is said assembly of individual side brushes.

6. The system, according to claim 2, wherein:
    at least one of said bottom brush element and side brush member includes bounded flow openings; and
    said flow openings enable a flowing of a fluid cleaning solution within said scrubbing region to flow between said scrubbing region and said receiving region, whereby said flow openings enable a transport of a washing debris from said limb during said use relative to said container.

7. The system, according to claim 6, wherein:
    at least one of said bottom brush element and said side brush member is releasable removable from said container.

8. A method, for cleaning an animal limb during a use, comprising the steps of:
    providing a container system, said container system comprising:
        a container bounding an internal receiving region and an access opening;
        at least one side brush element within said receiving region bounding a scrubbing region;
        said scrubbing region being within said receiving region;
        at least one bottom brush element in said receiving region;
        said at least one bottom brush element having bristles directed toward said access opening;

filling said container with a fluid cleaning solution flowing within said scrubbing region, whereby said fluid cleaning solution facilitates a cleaning of said limb during said use;

covering said container with a cleaning cover removably securable to said container proximate said access opening, said cleaning cover comprising:

at least one cover brush bounding a cleaning opening in said cleaning cover proximate said access opening upon an assembly with said container; and said at least one cover brush including cover bristle members;

said cover bristle members directed inwardly, thereby providing a scrubbing contact during a washing use with said limb; and inserting said animal limb through said cleaning opening into said scrubbing region and conducting a cleaning therein.

\* \* \* \* \*